(12) United States Patent
Sabin et al.

(10) Patent No.: US 7,306,446 B2
(45) Date of Patent: Dec. 11, 2007

(54) CO-INJECTION NOZZLE WITH IMPROVED INTERIOR LAYER TERMINATION

(75) Inventors: Douglas Sabin, Marblehead, MA (US); Paul Swenson, South Hamilton, MA (US); Ronald Roberts, Melrose, MA (US)

(73) Assignee: Kortec, Inc., Ipswich, MA (US)

( * ) Notice: Subject to any disclaimer, the term of this patent is extended or adjusted under 35 U.S.C. 154(b) by 263 days.

(21) Appl. No.: 10/851,284

(22) Filed: May 21, 2004

(65) Prior Publication Data

US 2004/0247739 A1     Dec. 9, 2004

Related U.S. Application Data

(60) Provisional application No. 60/472,550, filed on May 21, 2003.

(51) Int. Cl.
B29C 45/23     (2006.01)

(52) U.S. Cl. .................. 425/130; 425/564; 425/572

(58) Field of Classification Search ............... 425/130, 425/564, 572
See application file for complete search history.

(56) References Cited

U.S. PATENT DOCUMENTS

| 5,914,138 A | 6/1999 | Swenson |
| 5,935,615 A | 8/1999 | Gellert et al. |
| 6,596,213 B2 | 7/2003 | Swenson |

*Primary Examiner*—Tim Heitbrink
(74) *Attorney, Agent, or Firm*—Lahive & Cockfield LLP (57) ABSTRACT

Disclosed herein are a method and apparatus for combining two or more streams of a polymeric material to form a plastic object. The method and apparatus are capable of ending an interior layer of the plastic object at a desired length to avoid the need to clean selected surfaces of components used to form the plastic object. The method and apparatus increase the velocity of the polymeric material used to form the plastic object in certain components used to form the plastic object. The increase in the velocity of the polymeric material facilitates the ending of the interior layer of the plastic object.

25 Claims, 11 Drawing Sheets

Fig. 11

CO-INJECTION NOZZLE WITH IMPROVED INTERIOR LAYER TERMINATION

RELATED APPLICATIONS

This application claims the benefit of U.S. Provisional Patent Application No. 60/472,550, filed May 21, 2003, and entitled Co-Injection Nozzle with Improved Interior Layer Termination.

BACKGROUND OF INVENTION

The present invention relates to the co-extrusion of two or more streams of plastic material and the like, for introduction into a molding apparatus or similar devices. More particularly, the invention is directed to structure that enables better control of such co-extrusion, thereby providing for greater flexibility in the use of a wide range of suitable materials, extruding temperatures, and other conditions affecting the extrusion process.

With specific reference to injection systems for co-injecting at least two materials, the present invention relates to an improved technique, apparatus and resulting article for combining different annular flow streams of material where an interior layer of the combined annular flow stream can be terminated in a more abrupt fashion.

One conventional method of creating a multilayer object by co-injection molding is to inject annular layers of flowing material through a nozzle assembly into a mold. The result is a multilayer object having annular layers of material. The resulting multilayer object has an inner layer, an outer layer, and at least one interior layer sandwiched between the inner and outer layers. Depending on the end use requirements for the molded multilayer object it is often desirable to create a structure containing three or more annular layers of material. For example, in the case of a Polyethylene Teraphalate (PET) preform for a blown bottle, it is desirable to create a structure that contains three or more annular layers of material. The inner and outer layers of the preform are PET and at least one interior layer is formed from a material chosen to enhance the overall performance of the resulting plastic object, or to reduce the cost of the resulting plastic object. For example, interior layers may include one or more layers of a barrier material (MXD6 Nylon or EVOH), oxygen scavenging material, recycled material, or other performance-enhancing or cost-reducing material.

One problem in the field of co-injection molding resides in the need to end an interior layer of the material flow in a quicker or more abrupt manner. When molding a multilayer object it is often desirable to encapsulate the trailing edge of an interior layer of material with the inner and outer layers of material. The type of material used for the interior layer is often different from the type of material used for the inner and outer layers and as such, requires a region in the combining element extending from a stream combination area to a gate of a mold cavity to be free or clean of the interior layer material before the start of the next controlled volume shot of material into the mold cavity. This region must be free of the interior layer material so the inner and outer layer materials combine into a single encapsulating structure, or skin, that encapsulates the interior layer material. If this region is not free of the interior layer material the next controlled volume shot of material into the mold becomes contaminated with the interior layer material that remains in this region. Conventional nozzles for co-injection molding sequentially add layers of material to form a multiple layer output stream. As such, intermediate surface layers of conventional nozzles require cleaning, which is burdensome due to the sequential build of material layers.

Moreover, it is often desirable to have the interior layer material remain in close proximity to a base or gate portion of the resultant molded object. In the case of a PET preform, where the interior layer material can be a barrier layer, it is important to have the barrier layer extend as close as possible to the gate portion of the preform. Extending the barrier layer as close as possible to the gate portion of the preform results in a significant benefit when the preform is blown into a bottle. That is, a substantial portion if not the entire sidewall of the resulting bottle has the interior barrier layer. Absent a barrier layer that extends the entire sidewall length, the barrier property of the bottle can be adversely affected. The sidewall extends from a neck portion to a base portion of the resulting bottle. However, it is not always necessary for the gate portion of the bottle to include an interior layer as compared to the sidewall of the bottle, for the gate portion of the blown bottle tends to have a thickness sufficient to provide an adequate barrier to protect the contents of the bottle. Thus controlling a distribution of the material forming the interior layer of a molded object is important to the value and performance of the resulting molded object.

One conventional method of accomplishing this goal of controlling a distribution of the material forming the interior layer of a molded plastic object is to stop injecting the interior layer material into the mold while continuing to inject into the mold the inner and outer layer material. That is, when the flow of the interior layer material is stopped, the inner and outer layer material surrounding the interior layer material continues to flow dragging with them, in a downstream direction, the material that exited the interior layer material outlet of a combining element (e.g., nozzle assembly). In this manner, a stretching occurs between the interior layer material that remains substantially stationary in the outlet of the combining means and the interior layer material that has already exited the interior outlet of the combining element. This thinning eventually leads to breaking of the interior layer material from the combining element. Consequently, the inner and outer layer material makes contact once the interior layer material breaks from the combining means.

The breakage results in the formation of two interior layer components. The first is a trailing edge of the interior layer material just injected into a cavity of a mold. The second is a leading edge of the interior layer material which remains in the combining means for the next shot of material into the cavity. A further consequence of the breaking of the trailing edge of the interior layer material in this manner is the cleaning of such material from the gate of the combining element. As a result, the combining element is ready for the next injection cycle.

In the molded object, the structure of the trailing edge can be observed by coloring the discrete layers or by delaminating one or more layers of material after molding. Often, the trailing edge of the interior layer material has at least two observable regions. The first starts at the nominal core thickness of the molded object and quickly thins to an immeasurable thickness. The second is more burdensome to detect and can typically be detected by the lack of bonding between the inner and outer layers of material. This second region has only a microscopic quantity of interior layer material but it is enough to prevent the bonding of the inner and outer layer materials. In general, the first region accounts for ⅓ of the total tail length and the second region accounts for the remaining ⅔ of the total tail length.

Figure 1:
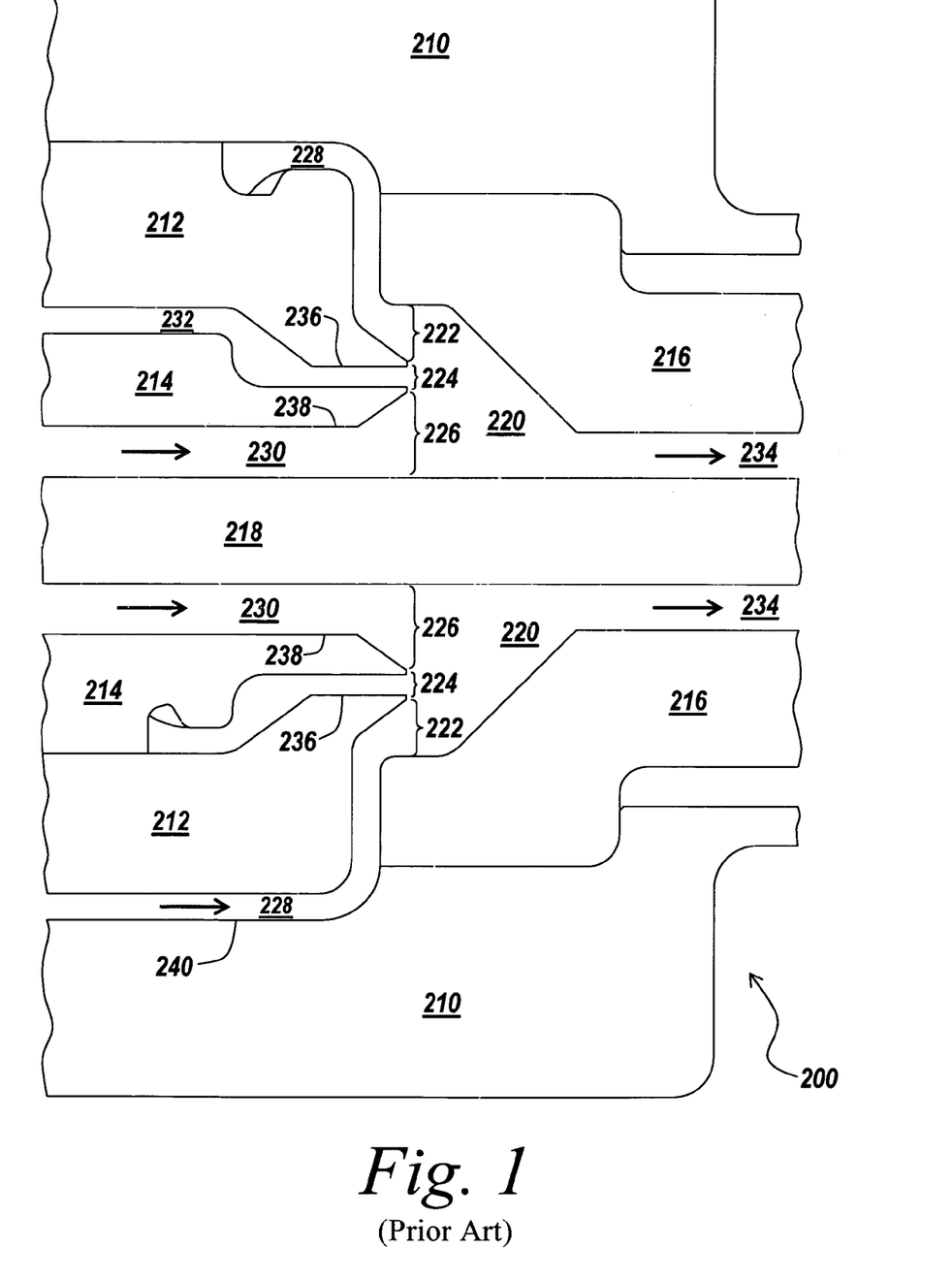
FIG. 1 is a partial cross sectional view of a prior art nozzle assembly configured to combine three separate material flows into one material flow for injection into a cavity.

FIG. 1 illustrates a partial cross section of a prior art three-layer co-injection nozzle assembly 200. Nozzle assembly 200 includes nozzle body 210, first nozzle member 212, second nozzle member 214, nozzle tip 216, and valve pin 218. Nozzle assembly 200 includes a third nozzle member (not shown) adapted to receive two or more material flows from respective material sources. Valve pin 218 in conjunction with second nozzle member 214 form inner flow channel 238 for carrying inner material stream 230 from an entrance orifice (not shown) to inner material egress orifice 226. First nozzle member 212 in combination with second nozzle member 214 form interior material flow channel 236. The interior material flow channel 236 directs interior material stream 232 from an entrance orifice (not shown) to interior material egress orifice 224. Nozzle body 210, first nozzle member 212, and nozzle tip 216 combine to form exterior material flow channel 240. The exterior material flow channel 240 directs an outer material stream 228 from an entrance orifice (not shown) to outer material egress orifice 222.

Nozzle tip 216, first nozzle member 212, second nozzle member 214, and valve pin 218 together define a combination volume 220. Combination volume 220 provides an area of combination where the inner material exiting orifice 226, the interior material exiting orifice 224 and the outer material stream 228 exiting orifice 222 combine to form combined output stream 234.

Outer material egress orifice 222, interior material egress orifice 224, and inner material egress orifice 226 are positioned in a common plane to provide combination volume 220 with three annular material streams. The three annular material streams flow substantially parallel to each other as each stream passes through each respective egress orifice 222, 224, and, 226 into combination volume 220.

Use of the conventional three layer co-injection nozzle 200, with an inner layer material stream 230 and an outer layer material stream 228 (i.e., skin) consisting of PET having an intrinsic viscosity (IV) of about 0.84 and an interior (core) layer material stream 232 consisting of MXD6 Nylon with a relative viscosity (RV) of about 2.65, the trailing edge or tail of the interior layer material in a molded preform with a 4 mm wall thickness often has a length of between about 15 mm and about 20 mm. One skilled in the art will recognize that the tail length of the interior layer material is a function of the viscosities of the materials used (i.e., skin and core materials) as well as the wall thickness of the molded preform. That is, as the preform wall becomes thinner, the tail of the interior layer material becomes longer in an inversely proportional relationship. For example, a preform with a 2 mm wall thickness formed with the conventional three layer co-injection nozzle 200 and the same core and skin materials identified above would have a tail length in a range of between about 30 mm and about 40 mm.

Figure 2:
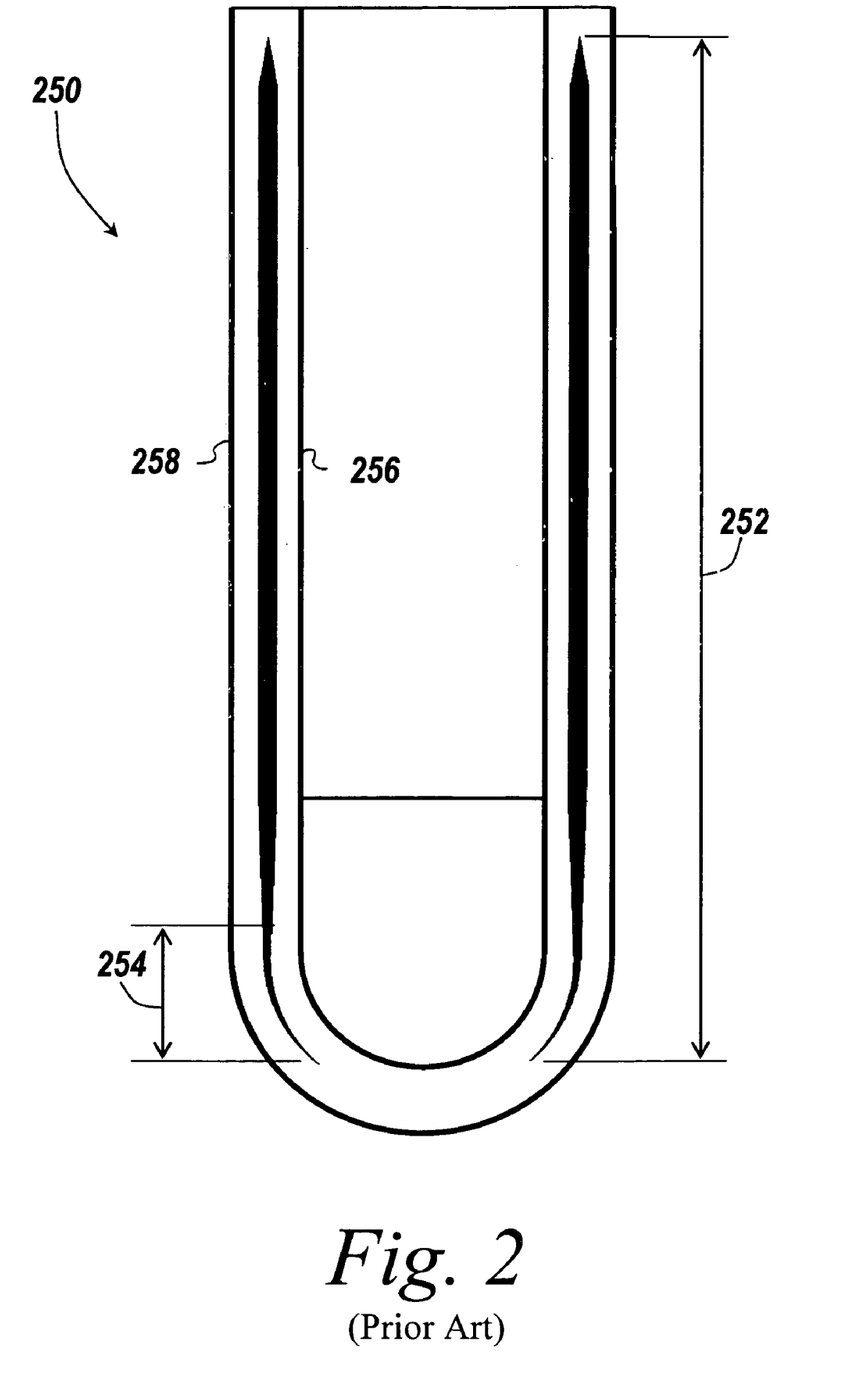
FIG. 2 is a cross section view of an exemplary object formed in a cavity supplied with a combined material flow from the nozzle assembly illustrated in FIG. 1.

FIG. 2 illustrates an exemplary prior art preform 250 produced with the conventional three-layer co-injection nozzle 200. Preform 250 has an inner layer 256 and an outer layer 258 formed of PET having an IV of about 0.84 and an interior layer 252 formed of MXD6 nylon with a RV of about 2.65. The wall thickness of preform 250 is about 4 mm. As such, interior layer 252 has a tail 254 with a length of between about 15 mm and about 20 mm.

SUMMARY OF INVENTION

The present invention addresses the above-described limitations of the conventional nozzle assemblies for co-injecting two or more materials into a cavity to form a molded object. The present invention provides an approach to increase the control of a volume of material forming an interior (core) layer of the molded object. The controllability of the volume of interior layer material provided by the methods and assemblies disclosed herein extend the length of a tail section of the interior layer and increase the volume amount of material in the tail section of the interior layer to provide an interior layer that extends from a neck portion to a gate portion of a preform without having the tail of the interior layer extend into the gate portion. Furthermore, the controllability of the volume of interior layer material provided by the present invention benefits other configurations of molded objects, for example a molded object having a five layer construction. Other exemplary configurations include, but are not limited to molded objects formed by offsetting the leading edge of an interior layer material from a velocity gradient in a controlled volume shot. A significant result of this controllability are manufactured objects having improved barrier layer protection which, in turn, extends the shelf life of products contained in such manufactured objects. Thus, the present invention beneficially extends the shelf life of goods and reduces the scrap rate and cost of such goods caused by shelf life expiration.

In one embodiment of the present invention, a nozzle assembly is disclosed. The nozzle assembly includes a first inlet to receive a first polymeric material and a second inlet to receive a second polymeric material. A first channel of the nozzle assembly has an inner passage to receive a first portion of the first polymeric material from the first inlet and feeds a combination area with the first polymeric material. A second channel of the nozzle assembly has an inner passage to receive a second portion of the first polymeric material from the first inlet and feed the combination area with the first polymeric material. A third channel of the nozzle assembly has an inner passage to receive a portion of the second polymeric material from the second inlet and feed the combination area with the second polymeric material. The combination area simultaneously combines the polymeric materials from the first, second, and third channels to form an annular output stream having multiple annular layers. Additionally, the combination area is configured to terminate formation of an interior layer of the annular output stream after termination of the flow of the second polymeric material from a second material source using a minimum volume of material flowing from the first and second channel while avoiding flow instabilities.

In another embodiment of the present invention, a method performed in a system for co-extruding a first polymeric material stream and a second polymeric material stream for introduction into a mold cavity to form a plastic piece is disclosed. The method positions a flow of a first portion of the first polymeric material stream substantially parallel to a central longitudinal axis of a nozzle assembly of the system to direct the flow of the first portion of the first polymeric material stream into a combination area of the nozzle assembly substantially parallel to the central longitudinal axis. The method positions a flow of a second portion of the first polymeric material stream to direct the flow into the combination area of the nozzle assembly at an angle offset from the central longitudinal axis. The method also positions a flow of the second polymeric material stream to direct the flow of the second polymeric material stream into the combination area of the nozzle assembly at angle offset from the central longitudinal axis. Performance of the method in the system simultaneously combines the flow of the first portion of the first polymeric material stream, the flow front of the second portion of the first polymeric material stream, and the flow of the second polymeric material stream in the combination area.

In one embodiment of the present invention, method for co-injection is disclosed. The method includes a step of forming a number of flow streams from two or more streams of plastic material that flow into a nozzle. Performance of the method combines the flow streams in a combination area of the nozzle to form an output stream having a number of annular layers. The output stream includes exterior layers that substantially form the inner and outer portion of a resulting plastic part and at least one interior layer enveloped by the exterior layers. The interior layer has a tail portion with a length of between about 3 mm and about 12 mm. The exterior layers of the output stream in the combination area has a cross sectional area of between about 70 mm$^2$ and about 160 mm$^2$.

In another embodiment of the present invention, a plastic object formed by the following steps is disclosed. The steps include receiving two or more polymeric materials at a nozzle and combining the two or more polymeric materials in the nozzle to form an output stream having a number of annular layers. The output stream includes exterior layers that substantially form the inner and outer portion of the plastic object and at least one interior layer that is enveloped by the exterior layers. The interior layer has an abrupt termination to form an end portion of the interior layer having a length of between about 3 mm and about 12 mm when a cylindrical wall portion of the plastic object has a wall thickness of about 4 mm.

BRIEF DESCRIPTION OF DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale show relative dimensions.

DETAILED DESCRIPTION

The ability to quickly end or break the tail of the material forming the interior layer of a molded plastic object leaves a region extending from a stream combination area in a nozzle to a gate of a mold cavity substantially free of the interior layer material to avoid the need to clean any surfaces in this region prior to a subsequent controlled volume shot. The stretching and eventual breaking of the interior layer material are achieved by controlling at least the flow characteristics of the inner and outer layer materials through the nozzle assembly. One such flow characteristic is velocity. The present invention increases the velocity of the material streams entering the area of a nozzle where simultaneous or near simultaneous combination of material streams occurs. The increased velocity and the simultaneous or near simultaneous combination of the material streams provide a quicker more abrupt breaking of the tail of the material forming the interior layer of the molded plastic object.

The present invention discloses methods, systems, and apparatuses for combining three material flows in a nozzle assembly cavity (e.g., stream combination area or combining means) to result in select nozzle assembly surfaces free of the interior layer material after the injection of a controlled volume shot of the materials into a mold cavity. Practicing of the invention disclosed herein provides techniques that avoid a need to clean selected surfaces in a region extending from a stream combination area of a nozzle to a gate of a mold cavity to form an object. Moreover, the desirable material flow characteristics provided by the methods, systems, and assemblies described herein improve the volume control of the interior layer material flowing into a mold cavity. This improved volume control allows for improved distribution of interior layer material in the molded object. The improved distribution of the interior layer material allows for a reduction in an amount of such material used to form the molded object without detracting from the performance, quality, or reliability of the resulting object.

Additionally, when using the inner and outer layer materials to quickly end or break the tail of the material forming the interior layer of a molded object, it is important to minimize the quantity of inner and outer layer material required to stretch and break the interior layer material. When this is accomplished the interior layer ends abruptly, allowing the tail of the interior layer to be moved closer to the gate of the resulting object.

The present invention minimizes the quantity of inner and outer layer material required to stretch and break an interior layer material by realizing a reduction in the cross sectional area of select outer and inner layer material orifices in a nozzle assembly. The nozzle assembly of the present invention reduces the volume of inner and outer layer material required to stretch and break an interior layer material when forming a molded object. By reducing the cross sectional area of select orifices in the nozzle assembly for the inner and outer layer materials, the interior layer material can be stretched and broken by a desired quantity of inner and outer layer materials (i.e., skin material) thus creating an abrupt interior layer material trailing edge in the molded object. Consequently, the nozzle assembly of the present invention achieves the goal of improving the volume control of material forming the interior layer of a molded object, which, in turn, advantageously improves the ability to extend the interior layer closer to the gate of the resulting part.

The present invention advantageously discloses an optimum total cross sectional area at the point of combination for the inner and outer layer materials in an exemplary nozzle assembly is between about 70 mm$^2$ and about 160 mm$_2$. Within this optimum range of total cross sectional area, the inner and outer layer materials at selected times are substantially free of the interior layer material. That is, the inner and outer layer materials flowing from the nozzle assembly of the present invention are well suited for stretching and abruptly breaking the interior layer material at a desired length and, in turn, avoid the need clean at least one surface of the nozzle assembly of the interior layer material. As such, for example, at the initial moments of injecting a controlled volume shot of material into a mold cavity the inner and outer layer materials are free of the interior layer material. Moreover, this reduced cross sectional area can create an interior layer material having a tail length of between about 10 mm and about 12 mm in a preform with a wall thickness of about 4 mm. Consequently, the tail length of the inner layer material achievable with the methods, systems and apparatuses of the present invention beneficially improves the full thickness length of the interior layer material (as measured between leading tail and trailing tail) in a selected preform sidewall by approximately 10 mm.

Additionally, if the interior layer material is offset from a substantially centered annular position with respect to the inner and outer layer materials as a result of adjusting the ratio of the inner layer material to outer layer material volumetric flow, the outer layer material orifices of the illustrative nozzle assembly can be proportioned mathematically to match the volumetric flow rates in order to maintain the advantageous cleaning properties of the inventive nozzle assembly.

Figure 3:
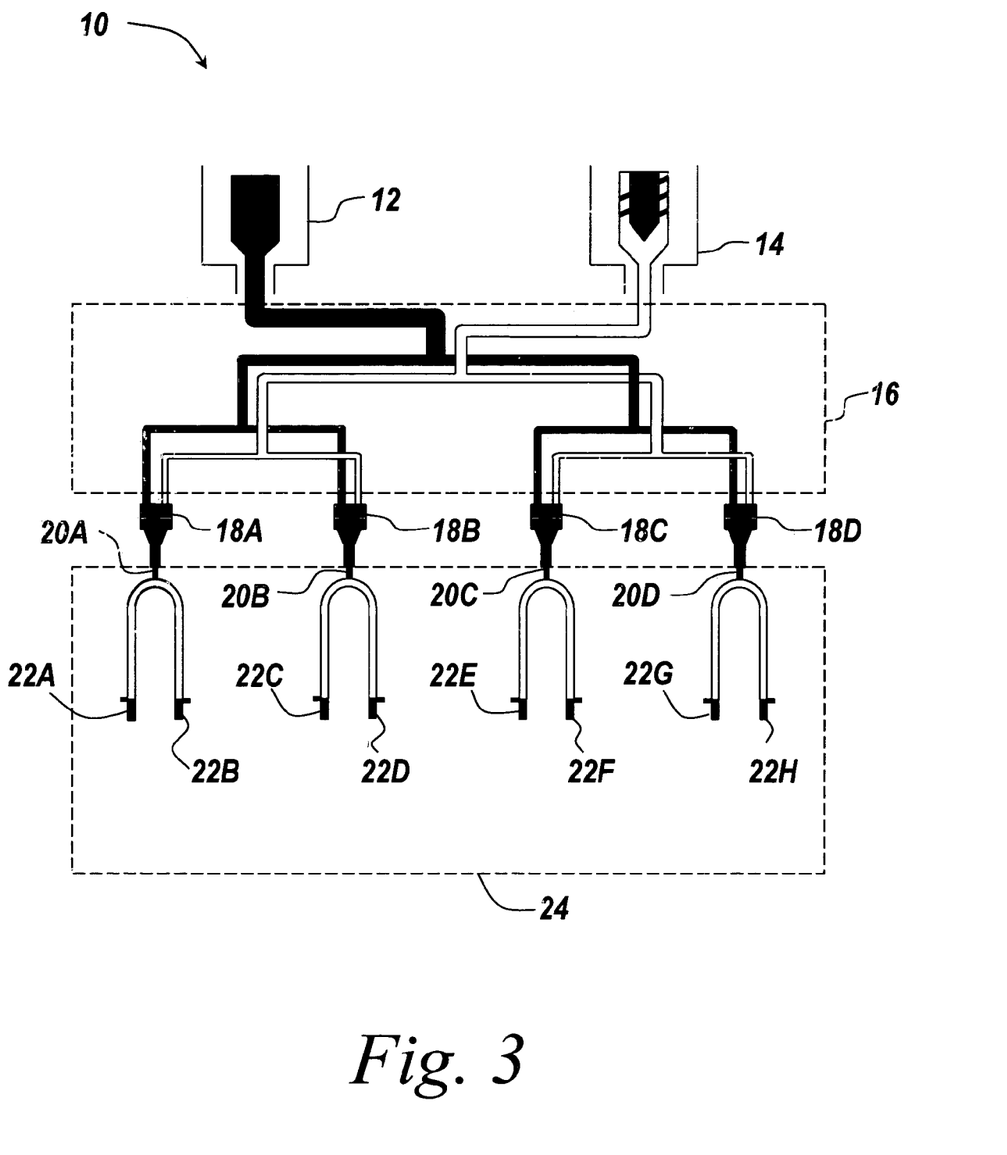
FIG. 3 is a schematic block diagram of a system configured for injecting a cavity with a combined material flow in accordance with the teachings of the present invention.

FIG. 3 illustrates an exemplary system suitable for practicing the present invention. Co-injection molding system 10 is configured to inject at least two materials into a mold cavity. Materials suitable for use with the present invention include polymer based materials such as, polyethylene terephthalate (PET), ethylene vinyl alcohol (EVOH), polycarbonates and the like. Co-injection molding system 10 includes a first material source 12, a second material source 14, and a manifold 16. Co-injection molding system 10 further includes nozzle assemblies 18A-18D and mold 24. Mold 24 includes gates 20A-20D and cavities 22A-22H.

In operation, first material source 12, second material source 14, and manifold 16 cooperatively operate to deliver at least two material streams to nozzle assemblies 18A-18D upstream of gates 20A-20D. Nozzle assemblies 18A-18D combine the material streams and feed gates 20A-20D with a combined material stream for delivery to cavities 22A-22H.

In one embodiment of the present invention, first and second material sources 12 and 14 are reciprocating screw injection units and manifold 16 is a hot runner having separate flow channels for each material and being arranged such that the material flow through each flow channel is balanced and equal.

Figure 4:
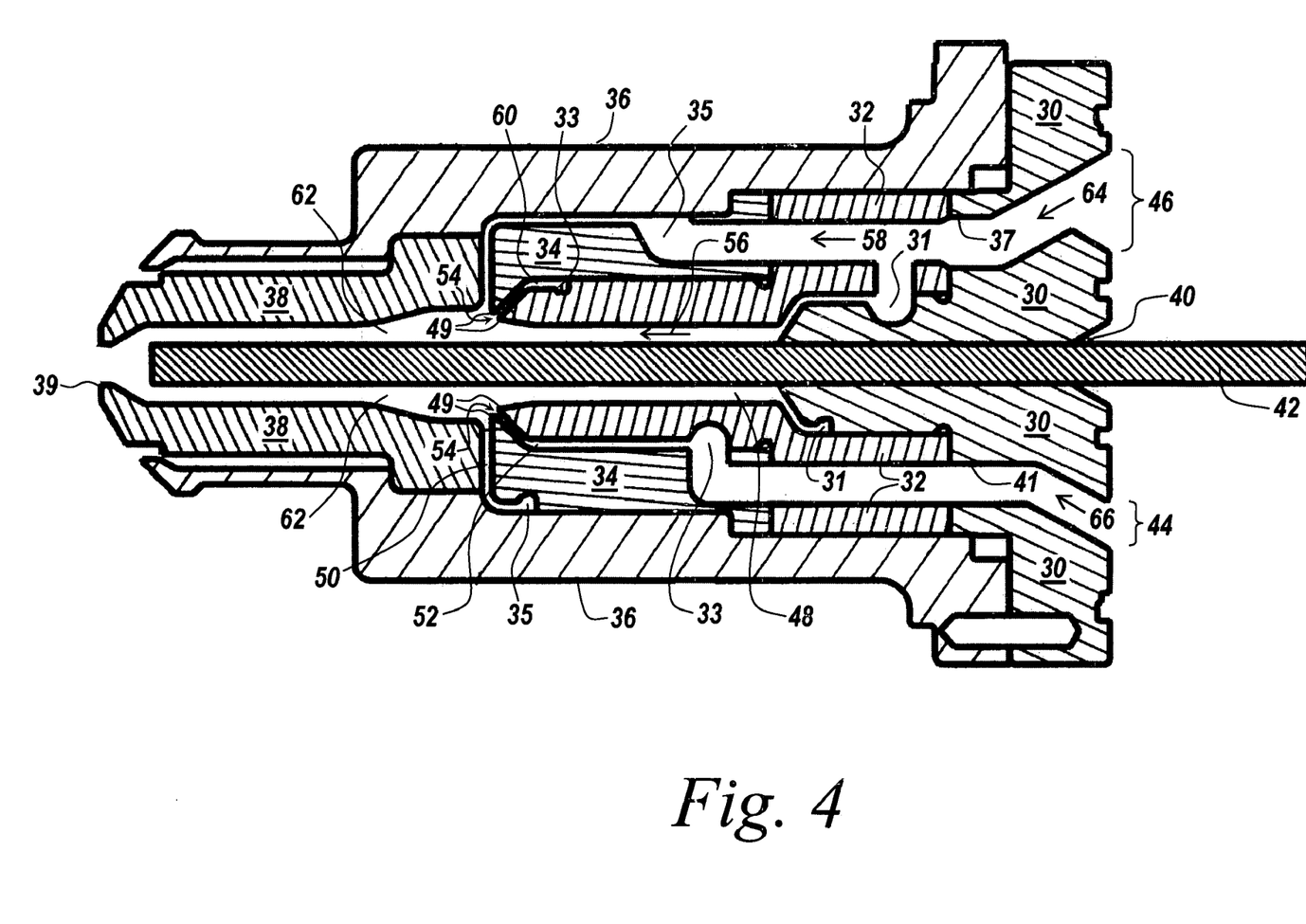
FIG. 4 is a cross section view of a nozzle assembly for forming a combined fluid flow from a plurality of materials in accordance with the teachings of the present invention.

FIG. 4 illustrates an exemplary nozzle assembly suitable for practicing the present invention. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form a number of conical, annular, and axial passages and channels in nozzle assembly 18. The nozzle assembly 18 is well suited for use in a co-injecting system, for example system 10, for forming a plastic object having two or more layers.

Inner combining means 30 includes a first inlet 46 to receive a first polymeric material 64, such as a skin material (i.e., inner and outer layer material), and a second inlet 44 to receive a second polymeric material 66, such as a core material (i.e., interior layer material). The inner combining means 30 further includes a through bore 40 configured to receive a valve pin 42. The through bore 40 extends through the middle combining means 32, and through a portion of the outer combining means 34 to allow the valve pin 42 to move in an axial direction along a longitudinal axis of the nozzle assembly 18. Through bore 40 has an inner wall diameter that varies along a central longitudinal axis of the nozzle assembly 18. Valve pin 42 is movable in an axial direction along the central longitudinal axis of nozzle assembly 18 to assist in controlling the flow of the first polymeric material 64 and second polymeric material 66 through nozzle assembly 18 and into mold 24.

Middle combining means 32 cooperatively engages with the inner combining means 30 form a portion of the plurality of annular flow channels in nozzle assembly 18. Middle combining means 32 receives from channel 37 the first polymeric material 64 and receives from channel 41 the second polymeric material 66 to manipulate the flow of each of the polymeric materials through a plurality of annular fluid carrying passages or channels. The flow manipulation carried out by middle combining means 32 initiates the creation of an outer material stream 58 and an inner material stream 56 that together encapsulate an interior material stream 60.

Figure 7:
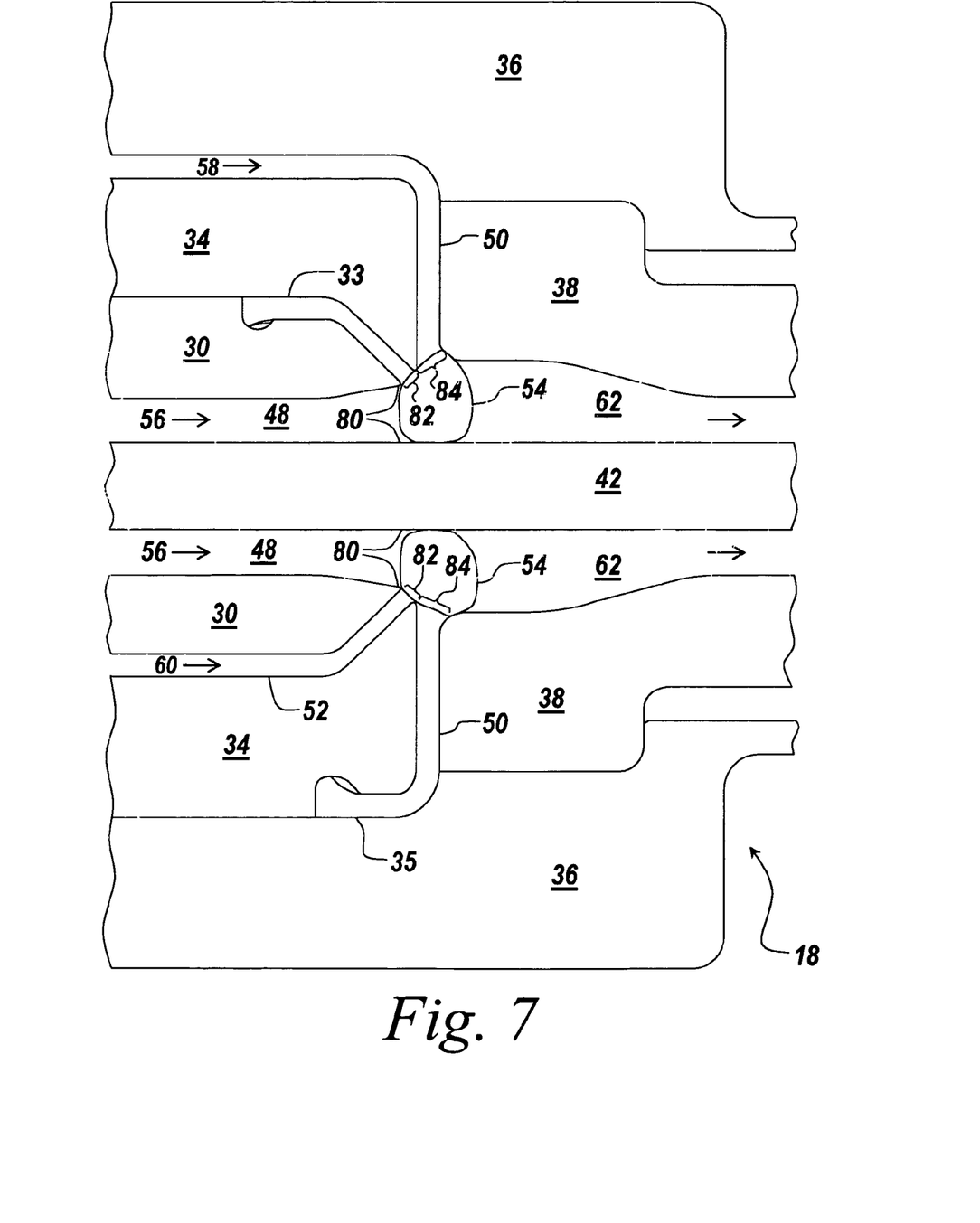
FIG. 7 is an exemplary cross section view of a portion of the nozzle assembly illustrated in FIG. 4 which illustrates an area of the nozzle configured to combine the plurality of material flows to form a combined material flow.

The middle combining means 32 when coupled with the inner combining means 30 forms a wrapped-coat-hanger die 31 that circumferentially extends around the through bore 40 and valve pin 42. Wrapped-coat-hanger die 31 provides annular fluid flow passage 48 with a uniform melt distribution of the first polymeric material 64. Annular fluid flow passage 48 channels an annular flow stream of the inner material stream 56 into stream combination area 54 through orifice 80. FIG. 7 illustrates orifice 80 with more detail.

Outer combining means 34 cooperatively engages with middle combining means 32 to form one or more fluid carrying passages or channels to manipulate the second polymeric material 66 forming an interior layer of the resulting plastic object. The outer combining means 34 when coupled with the middle combining means 32 forms a wrapped-coat-hanger die 33 that circumferentially extends around inner material stream 56, through bore 40, and valve pin 42. Wrapped-coat-hanger die 33 provides conical fluid flow passage 52 with a uniform melt distribution of the second polymeric material 66. Conical flow passage 52 feeds an annular stream of the second polymeric material 66 into stream combination area 54 through orifice 82. FIG. 7 illustrates orifice 82 with more detail.

The outer combining means 34 cooperatively engages with nozzle body 36. The outer combining means 34 when coupled with the nozzle body 36 forms wrapped-coat-hanger die 35 that circumferentially extends around the interior layer stream 52, the inner layer stream 56, the through bore 40, and the valve pin 42. Wrapped-coat-hanger die 35 provides radial fluid flow passage 50 with a uniform melt distribution of the first polymeric material 64. Radial fluid flow passage 50 feeds stream combination area 54 with a flow of first polymeric material 64 through orifice 84. The first polymeric material 64 fed into the stream combination area 54 through orifice 84 forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 has an inner passageway diameter of between about 6.7 mm and about 17.2 mm. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream 49. Stream combination area 54 is discussed in more detail relative to FIGS. 7 and 8.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20A-20D.

The annular output stream 49 formed by the stream combination area 54 has an outer annular skin layer and an inner annular skin layer formed of the first polymeric material 64, and an interior or core annular layer formed of the second polymeric material 66. The inner and outer skin layers of the first polymeric material 64 each have a substantially like cross sectional area as the materials flow through the fluid flow passage 62 to the output portion 39. The inner and outer skin layers of the first polymeric material 64 encapsulate the interior layer of the second polymeric material 66, which forms a core portion of a resulting plastic object.

The ability of the nozzle 18 to form an annular output stream 49 with an inner and outer annular skin layer of a first polymeric material 64 having uniform cross sectional area that encapsulates an annular interior layer of a second polymeric material 66 allows a co-injection system employing such a nozzle assembly to improve distribution of a volume of material forming the core portion of the resulting plastic piece. For example, use of the nozzle assembly 18 allows a co-injection system to lengthen a barrier region in the resulting plastic object without increasing the risk of contaminating each initial portion of a controlled volume shot with core material. The result of lengthening the barrier region in a preform results in improved barrier performance of the resulting plastic object. Furthermore, the ability of the nozzle assembly 18 to form the annular output stream 49 with annular inner and outer skin layers of the first polymeric material 64 having substantially like cross sectional areas that encapsulate an annular interior layer of the second polymeric material 66 allows the interior layer or core layer to be stretched and eventually broken in a quicker more abrupt manner leaving a region of the nozzle assembly 39 between the combination area 54 and the output portion 39 substantially free of the second polymeric material 66 at completion of each controlled volume shot. This provides the nozzle assembly 18 with an advantageous quick clean feature where an amount of skin material needed to break the interior layer material and the trailing edge of the interior layer material from the combination area 54 to output portion 39 is significantly reduced.

As a result of this quick clean ability, subsequent shots or fills of a mold cavity are not contaminated with the interior layer which, if present, flows into the mold cavity, catches the flow front of the shot and flows toward the inside, the outside, or both of the molded object depending on the location in the melt stream, forming an extra layer close to the inside, the outside, or both of the molded object. This extra layer, known as scale, is a defect in the part. The ability of the nozzle assembly 18 to have a self-cleaning action allows a mold cavity and the output portion 39, and any other processing elements therebetween to remain substantially free of the first polymeric material after injection of a controlled volume shot.

Figure 5:
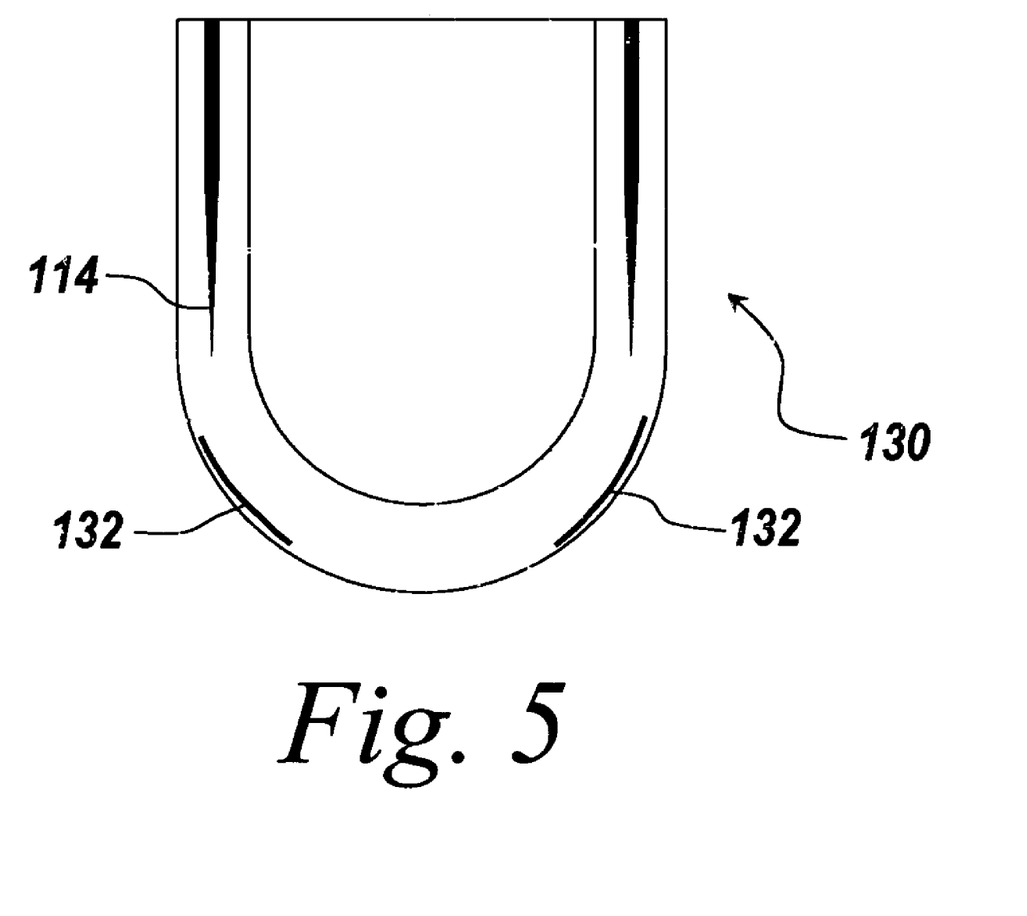
FIG. 5 is a partial cross section of a molded plastic object having at least one undesirable feature.

FIG. 5 illustrates the effect of not fully cleaning the interior layer material or the second polymeric material 66 from the region in the nozzle assembly 18 extending from the stream combination area 54 to the gate 20 of a mold cavity 22 associated with nozzle assembly 18. When interior layer material remains in this region it catches the flow front of the initial volume of material of a subsequent controlled volume shot, flows toward the inner or outer surfaces of the resulting plastic object to form an extra layer, which is referred to in the art as scale. In FIG. 5, the interior layer material that remained in this region caught the flow front of a subsequent shot and is illustrated as having flowed towards the outside surface of the plastic object 130 and created extra layers or scale 132 in the plastic object 130. Scale 132 is considered a part defect and can cause a blemish in the plastic object if the plastic object is further manipulated.

Figure 6:
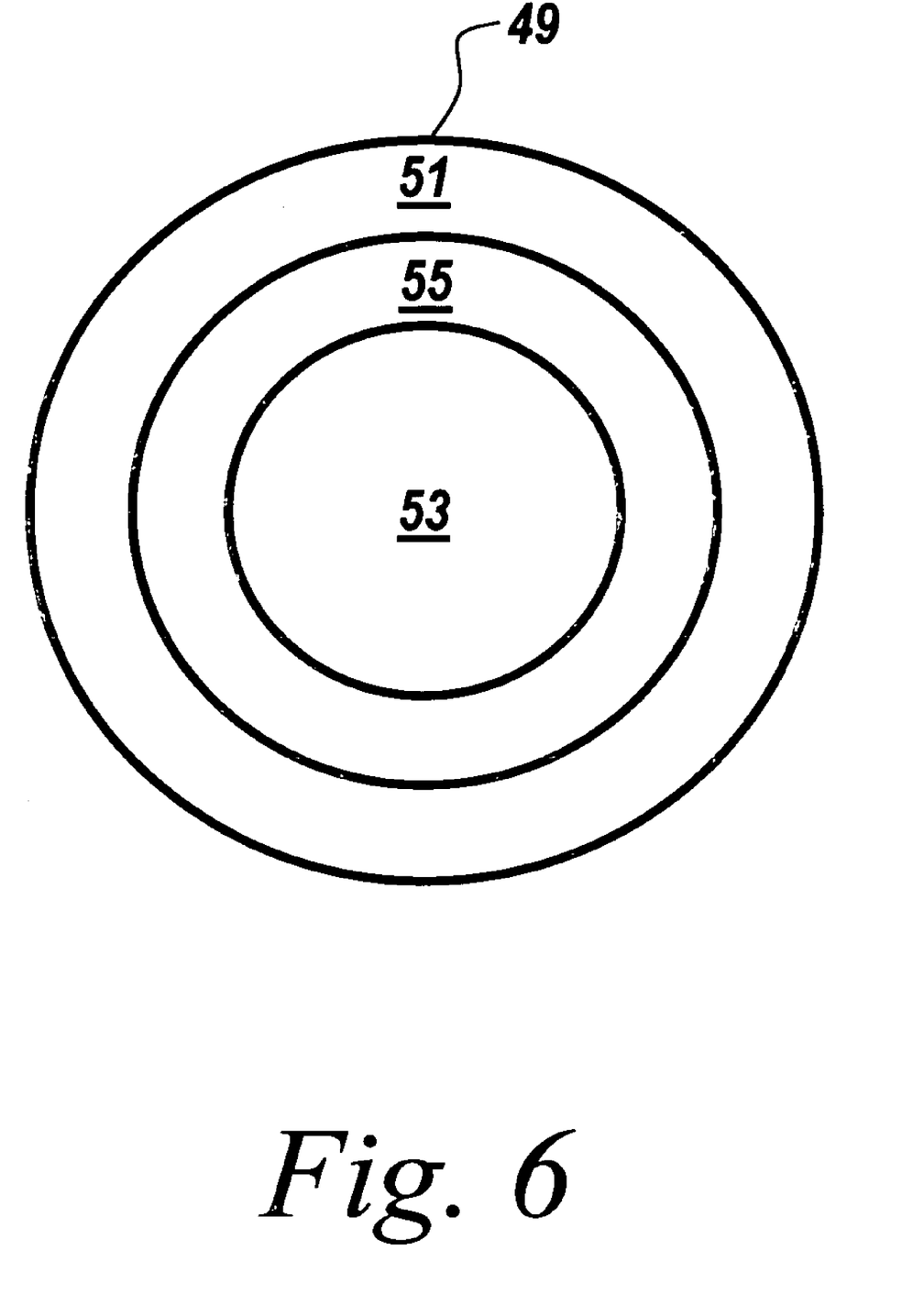
FIG. 6 is an exemplary cross section of an annular output stream formed by a nozzle assembly in accordance with the teachings of the present invention.

FIG. 6 is an exemplary cross section of annular output stream 49. Annular output stream 49 includes a substantially equal volume of outer annular skin layer 51 and inner annular skin layer 53. The outer annular skin layer 51 and inner annular skin layer 53 encapsulate the interior annular core layer 55 at select times during the flow of the annular output stream 49 from nozzle assembly 18.

FIG. 7 is a partial cross sectional view of nozzle assembly 18. FIG. 7 illustrates stream combination area 54 in detail. Radial fluid flow passage 50 feeds stream combination area 54 through orifice 84 with a uniform distribution of the outer material stream 58. Annular fluid flow passage 48 feeds stream combination area 54 through orifice 80 with a uniform distribution of the inner material stream 56. Conical fluid flow passage 52 feeds stream combination area 54 through orifice 82 with a uniform distribution of the interior material stream 60. Stream combination area 54 combines the outer material stream 58 from orifice 84, the inner material stream 56 from orifice 80, and the interior material stream 60 from orifice 82 to form annular output stream 49. That is, stream combination area 54 combines the inner material stream 56, the interior material stream 60, and outer material stream 58 to form the inner annular skin layer 53, the interior annular core layer 55, and the outer annular skin layer 51, respectively, of annular output stream 49.

Radial fluid flow passage 50 enters the stream combination area 54 substantially perpendicular to the central longitudinal access of through bore 40. Annular fluid flow passage 48 enters the stream combination area 54 substantially parallel to the central longitudinal access of through bore 40. As such, outer material stream 58 enters the stream combination area 54 through orifice 84 substantially perpendicular to inner material stream 56. Conical fluid flow passage 52 enters stream combination area 54 between orifice 80 and orifice 84 at an acute angle relative to a longitudinal axis of through bore 40.

Figure 8:
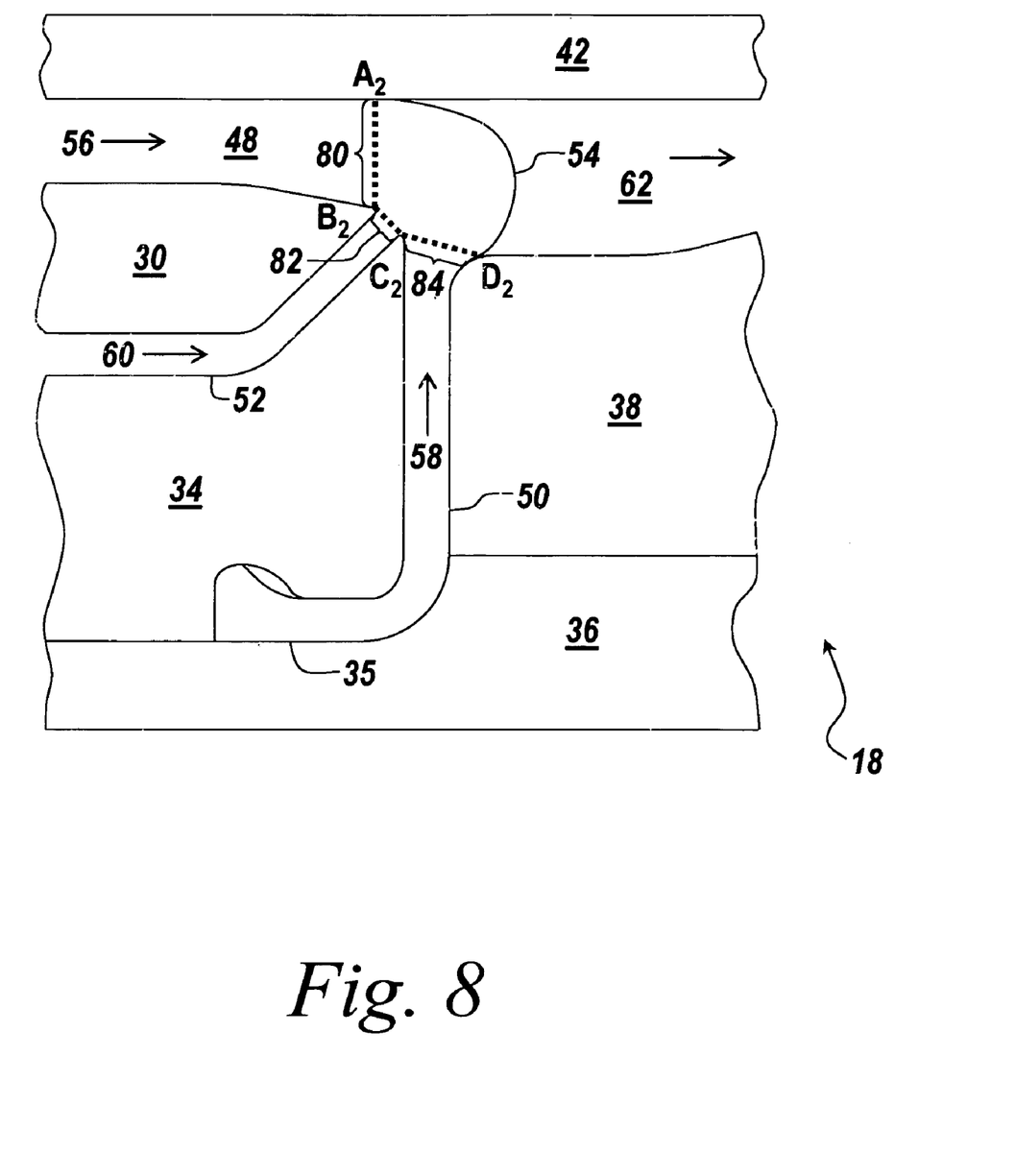
FIG. 8 is a more detailed cross section view of the orifices that feed a stream combination area of the nozzle assembly illustrated in FIG. 4.

FIG. 8 illustrates a portion of the stream combination area 54 in more detail. Those skilled in the art will recognize that stream combination area 54 circumferentially extends around valve pin 42 to form annular output stream 49. Orifice 80 as measured along line "$A_2$-$B_2$" has a cross sectional area of between about 22 mm and about 76 mm$^2$. Orifice 82 as measured along line "$B_2$-$C_2$" has a cross sectional area of between about 17 mm$^2$ and about 23 mm$^2$. Orifice 84 as measured along line "$C_2$-$D_2$" has a cross sectional area of between about 28 mm$^2$ and about 102 mm$^2$. In one embodiment of the present invention, orifice 80 as measured along line "$A_2$-$B_2$" has a cross sectional area of about 51 mm$^2$, orifice 82 as measured along line "$B_2$-$C_2$" has a cross sectional area of about 23 mm$^2$, and orifice 84 as measured along line "$C_2$-$D_2$" has a cross sectional area of about 71 mm$^2$. The cross sectional areas of orifices 80, 82, and 84 are considered smaller than the prior art orifices. A result of the smaller cross sectional areas of orifices 80, 82, and 84 is an increase in the velocity profile of the outer material stream 58, the inner material stream 56, and the interior material stream 60 at the entrance to stream combination area 54 without decreasing the volume of material that can flow through stream combination area 54.

Figure 9:
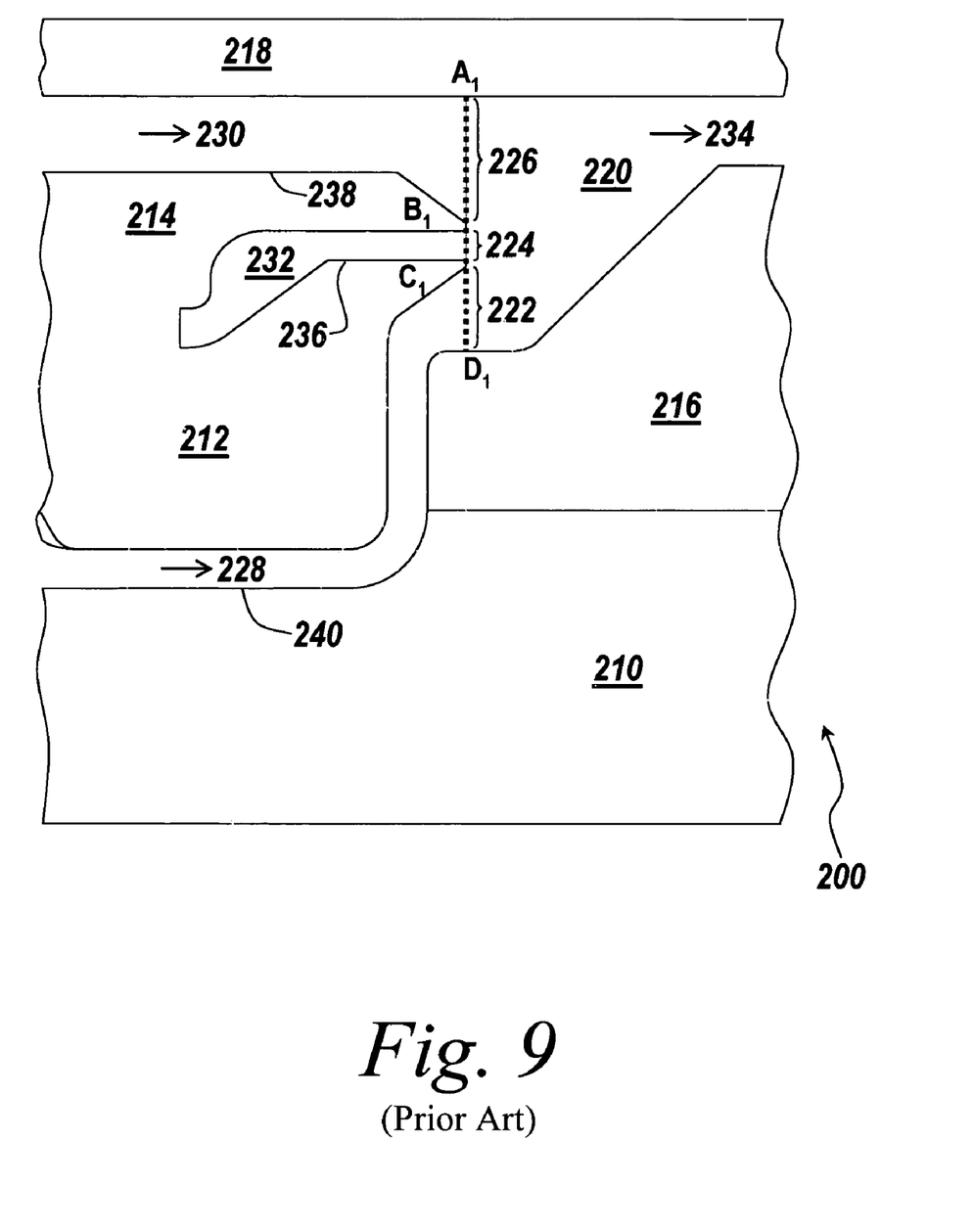
FIG. 9 is a cross section view of a portion of the prior art nozzle illustrated in FIG. 1 illustrating orifices that feed a combination cavity with material for combination into a combined fluid flow.
Figure 10:
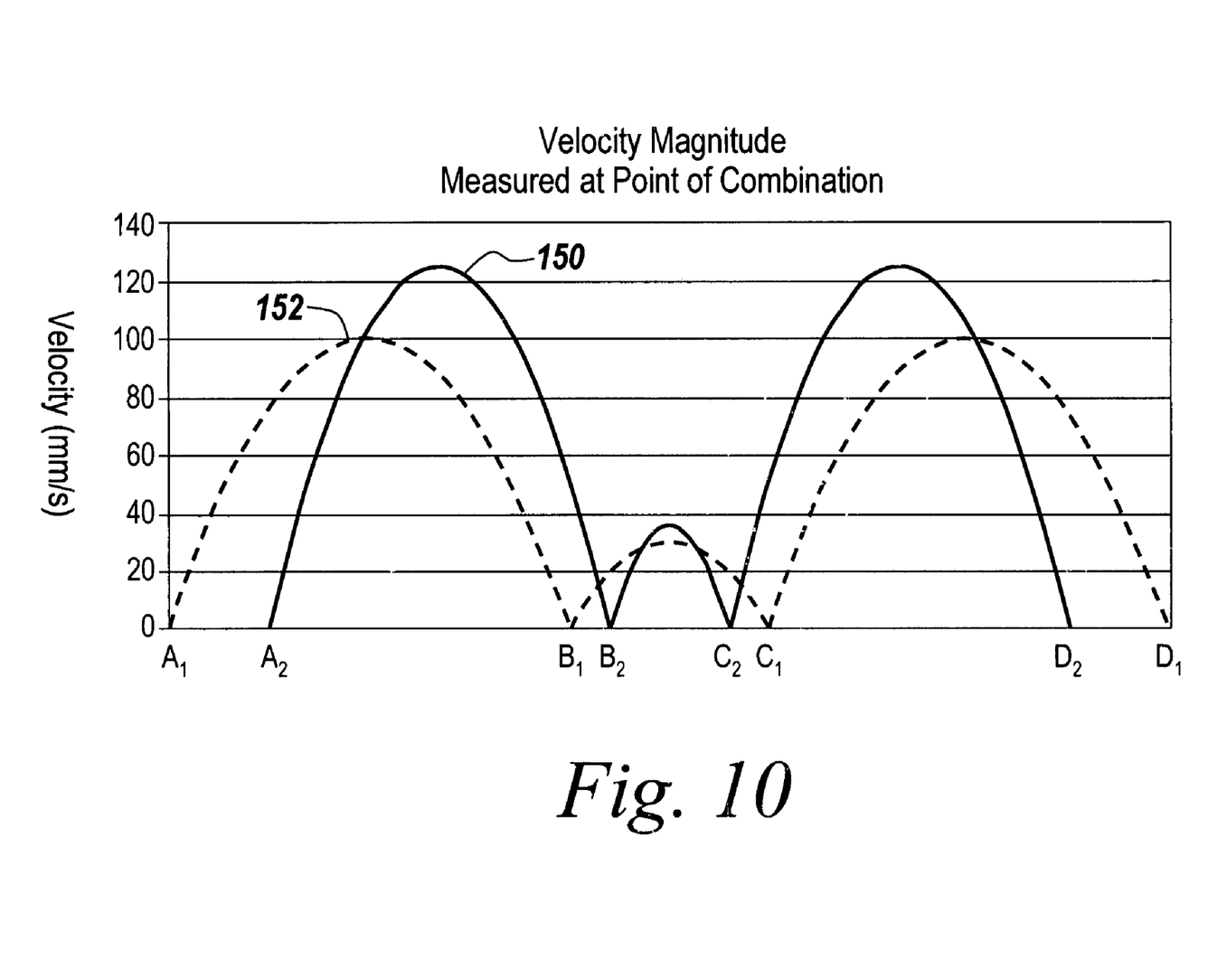
FIG. 10 graphically illustrates velocity profile differences of material flowing through the orifices entering the stream combination area of a nozzle assembly in accordance with the teaching of the present invention and material flowing through orifices entering the combination cavity of the prior art nozzle assembly illustrated in FIG. 1.

FIG. 9 is a partial cross section of nozzle assembly 200 discussed in relation to FIG. 1. The entrance to combination volume 220 is defined by orifices 222, 224, and 226 in the plane defined by line "$A_1$-$B_1$-$C_1$-$D_1$". Combination volume 220 receives inner material stream 230 through orifice 236, interior material stream 232 through orifice 224, and outer material stream 228 through orifice 222. In this manner, the inner material stream 230, the interior material stream 232, and the outer material stream 228 enter combination volume 220 substantially parallel to a longitudinal axis of valve pin 218. As such, combination volume 220 receives three material flow fronts flowing substantially parallel to one another for combination into output stream 244. In nozzle assembly 200, orifice 222 along line "$C_1$-$D_1$" has a cross sectional area of about 102 mm$^2$, orifice 224 along line "$B_1$-$C_1$" has a cross sectional area of about 28 mm$^2$, and orifice 226 along line "$A_1$-$B_1$" has a cross sectional area of about 76 mm$^2$, FIG. 10 graphically illustrates a simulated velocity profile plot 150 of the inner material stream 56, the interior material stream 60, and the outer material stream 58 entering the stream combination area 54 of nozzle assembly 18 at orifice 80, orifice 82, and orifice 84, respectively. FIG. 10 also graphically illustrates a simulated velocity profile plot 152 of the inner material stream 230, the interior material stream 232, and the exterior material stream 228 entering the combination volume 220 at orifice 226, orifice 224, and orifice 222, respectively. The Y-axis of FIG. 10 represents the flow velocity in "mm/s" for each respective material stream as the material exits a respective orifice to enter either stream combination area 54 or combination volume 220. The X-axis of FIG. 10 represents each respective orifice at the entrance to either stream combination area 54 or combination volume 220 as measured along lines "$A_1$-$B_1$-$C_1$-$D_1$".

Plot 150 graphically represents the velocity profile of each respective material stream entering stream combination area 54. That is, plot 150 between "$A_2$-$B_2$" represents the velocity profile of the inner material stream 56 as it passes through orifice 80 to enter stream combination area 54. In similar fashion; plot 150 between "$B_2$-$C_2$" represents the velocity profile of the interior material stream 60 as it passes through orifice 82 to enter stream combination area 54. Likewise, plot 150 between "$C_2$-$D_2$" represents the velocity profile of the outer material stream 58 as it passes through orifice 84 to enter stream combination area 54.

Plot 152 graphically represents the velocity profile of each material stream entering combination volume 220. That is, plot 152 between "$A_1$-$B_1$" represents the velocity profile of the inner material stream 230 as it passes through orifice 226 to enter combination volume 220. In similar fashion, plot 152 between "$B_1$-$C_1$" represents the velocity profile of the interior material stream 232 as it passes through, orifice 224 to enter combination volume 220. Likewise, plot 152 between "$C_1$-$D_1$" represents the velocity profile of the outer material stream 228 as it passes through orifice 222 to enter combination volume 220.

As FIG. 10 graphically illustrates, the smaller cross sectional area of each orifice 80, 82, and 84 feeding stream combination area 54 with a material stream advantageously increases the velocity of each material stream. The increase in the velocity for each material stream provided by orifices 80, 82, and 84 allow nozzle assembly 18 to achieve greater distribution control an interior layer material being injected into a mold cavity. This increase in material flow velocity advantageously allows nozzle assembly 18 to abruptly end the interior layer of a controlled volume shot which allows the thickness of the interior layer material to be positioned closer to the gate portion of the molded object. The increased volume of the interior layer material and the abrupt manner of breaking the interior layer material allows nozzle assembly 18 to produce an interior layer having a tail of between about 3 mm and about 12 mm in a preform having a wall thickness of about 4 mm.

Figure 11:
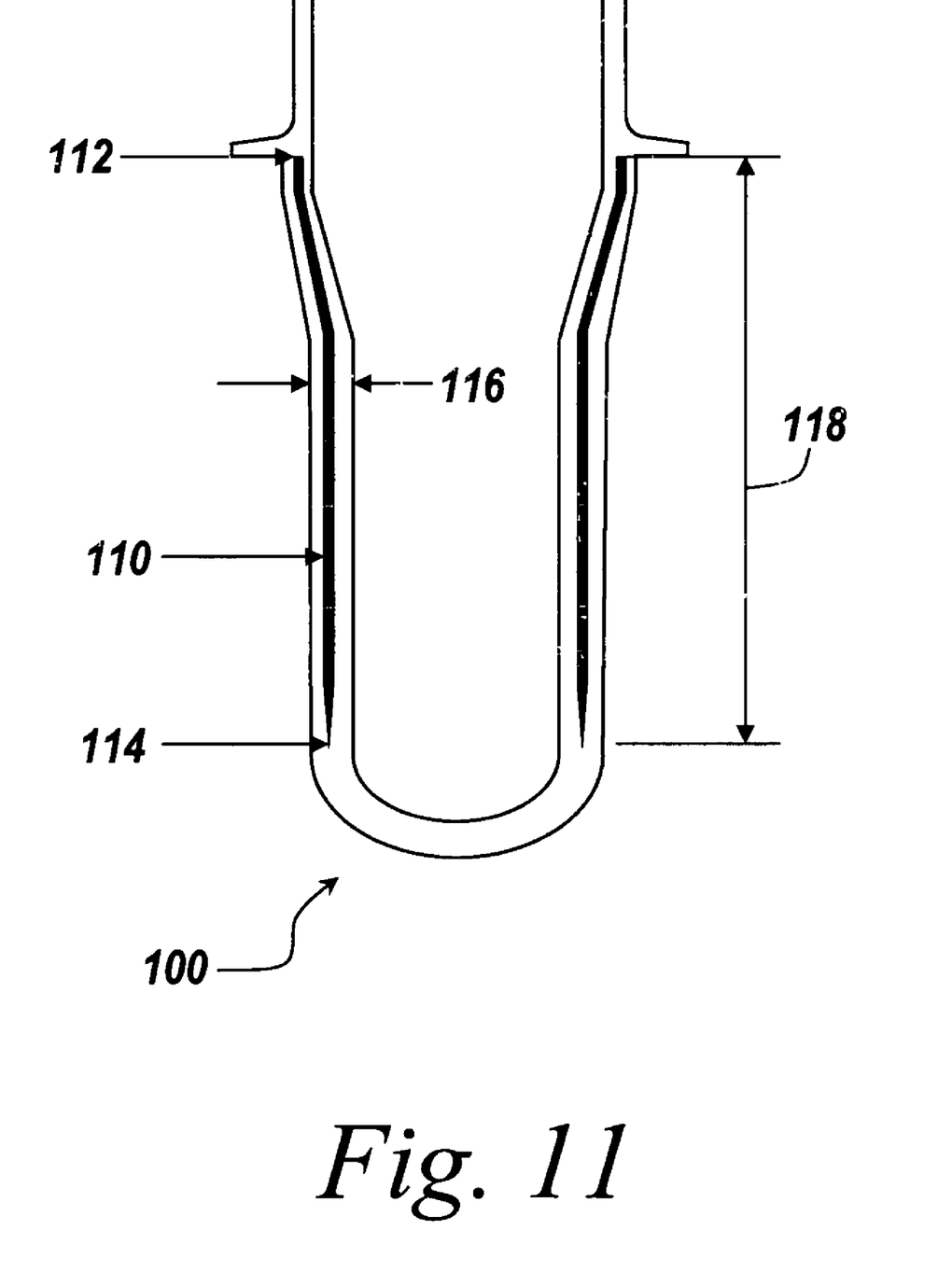
FIG. 11 is a cross section of an exemplary object capable of being formed in accordance with the teachings of the present invention.

FIG. 11 illustrates a cross section of an exemplary plastic object 100 formed in accordance with the illustrative embodiment of the present invention. The exemplary plastic object 100 is a preform for a container such as, a bottle. Although the illustrative embodiment is discussed in relation to the exemplary plastic object 100, those skilled in the art will appreciate that the ability to control distribution of an interior layer when forming a plastic object is applicable to other types of plastic objects and the processes for forming those plastic objects. Other types of plastic objects include, but are not limited to shingles, bumpers, containers such as beverage, food, medical, pharmacological, containers having properties relating to gas permeability, gas scavengability and other multiple material co-injected parts. Other types of processes for forming plastic objects include, but are not limited to multiple layer extruded products.

Plastic object 100 includes an interior core portion 110 encapsulated by a skin portion 116. The interior core portion 110 is formed from the second polymeric material 66 and the skin portion 116 is formed from the first polymeric material 64. The interior core portion 110 includes a leading edge 112 and a trailing edge 114, or tail. The interior core portion 110 has a substantially annular shape that extends circumferentially about a central longitudinal axis of the plastic object 100 from a neck portion 120 to a gate portion 122. The region between the neck portion 120 and the gate portion 122 is referred to as core distribution 118. That is, the core distribution 118 in the plastic object 100 extends from the leading edge portion 112 to the trailing edge portion 114 of the interior core portion 110. In one illustrative embodiment of the present invention, the core distribution 118 has a length of between about 35 mm and about 45 mm, with the trailing edge portion 114 having a length of between about 3 mm and about 12 mm when the plastic object 100 has a wall thickness of about 4 mm in at least the region of the core distribution 118.

While the present invention has been described with reference to the above illustrative embodiments, those skilled in the art will appreciate that various changes in form and detail may be made without departing from the intended scope of the present invention as defined in the appended claims.

What is claimed is:

1. A nozzle assembly comprising,
  a first inlet to receive a first polymeric material,
  a second inlet to receive a second polymeric material,
  a first channel having an inner passage to receive a first portion of the first polymeric material from the first inlet and feed a combination area within the nozzle assembly with the first polymeric material,
  a second channel having an inner passage to receive a second portion of the first polymeric material from the first inlet and feed the combination area with the first polymeric material,
  a third channel having an inner passage to receive a portion of the second polymeric material from the second inlet and feed the combination area with the second polymeric material,
  wherein the combination area simultaneously combines the polymeric materials from the first, second, and third channels to form an annular output stream having multiple annular layers, and
  wherein the combination area is configured to terminate the flow of the second polymeric material from the third channel using a minimum volume of material flowing from the first and second channels while avoiding flow instabilities.

2. The nozzle assembly of claim 1, wherein a flow rate of an inner annular layer and a flow rate of an outer annular layer of the annular output stream are substantially similar entering the combination area.

3. The nozzle assembly of claim 1, wherein a cross sectional area of an inner annular layer and a cross sectional area of an outer annular layer of the annular output stream are substantially similar entering the combination area.

4. The nozzle assembly of claim 1, wherein a cross sectional area of an inner annular layer and a cross sectional area of an outer annular layer of the annular output stream are mathematically apportioned to a flow rate of the inner annular layer and a flow rate of the outer annular layer of the annular output stream.

5. The nozzle assembly of claim 1, wherein interior layer is positioned on a zero velocity gradient of the annular output stream.

6. The nozzle assembly of claim 1 further comprising, a valve pin centrally located within the second channel to form an annular inner passage therein.

7. The nozzle assembly of claim 1, wherein the first channel comprises a first orifice defining a first entrance to the combination area through which the first portion of the first polymeric material flows.

8. The nozzle assembly of claim 1, wherein the second channel comprises a second orifice defining a second entrance to the combination area through which the second portion of the first polymeric material flows.

9. The nozzle assembly of claim 1, wherein the third channel comprises a third orifice defining a third entrance to the combination area through which the second polymeric material flows.

10. The nozzle assembly of claim 7, wherein the first orifice has a cross sectional area of about 51 $mm^2$.

11. The nozzle assembly of claim 8, wherein the second orifice has a cross sectional area of about 71 $mm^2$.

12. The nozzle assembly of claim 9, wherein the third orifice has a cross sectional area of about 23 $mm^2$.

13. The nozzle assembly of claim 7, wherein the first orifice has a cross sectional area of between about 22 $mm^2$ and about 76 $mm^2$.

14. The nozzle assembly of claim 8, wherein the second orifice has a cross sectional area of between about 28 mm and about 102 $mm^2$.

15. The nozzle assembly of claim 9, wherein the third orifice has a cross sectional area of between about 17 $mm^2$ and about 23 $mm^2$.

16. The nozzle assembly of claim 1, further comprising a flow restrictor movably disposed in a through bore of said nozzle along the longitudinal axis of the combination area to provide in part an inner cylindrical portion of the combination area and in part to control at least the annular flow in a portion of the through bore.

17. The nozzle assembly of claim 1, further comprising a nozzle tip for directing the annular flow into a gate associated with the mold cavity.

18. The nozzle assembly of claim 7, wherein the average velocity of the first portion of the first polymeric material exiting the first orifice is about 106 mm/s.

19. The nozzle assembly of claim 8, wherein the average velocity of the second portion of the firs polymeric material exiting the second orifice is about 76 mm/s.

20. The nozzle assembly of claim 9, wherein the average velocity of the second material exiting the third orifice is about 36 mm/s.

21. The nozzle assembly of claim 7, wherein the average velocity of the first portion of the first polymeric material exiting the first orifice is between about 27 mm/s and about 246 mm/s.

22. The nozzle assembly of claim 8, wherein the average velocity of the second portion of the first polymeric material exiting the second orifice is between about 20 mm/s and about 223 mm/s.

23. The nozzle assembly of claim 9, wherein the average velocity of the second polymeric material exiting the third orifice is between about 11 mm/s and about 57 mm/s.

24. The nozzle assembly of claim 9, wherein a minimum cross sectional area of third orifice is dimensioned to avoid degradation of a property of the second polymeric material flowing therethrough.

25. The nozzle assembly of claim 9, wherein the second polymeric material has a thickness of between about 0.5 mm and about 1.5 mm when flowing through the third orifice.

* * * * *